(12) United States Patent
Kambhatla

(10) Patent No.: US 7,765,323 B2
(45) Date of Patent: Jul. 27, 2010

(54) SINK DEVICE ADDRESSING MECHANISM

(75) Inventor: Srikanth Kambhatla, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 11/648,367

(22) Filed: Dec. 29, 2006

(65) Prior Publication Data
US 2008/0162725 A1 Jul. 3, 2008

(51) Int. Cl.
*G06F 15/16* (2006.01)
(52) U.S. Cl. .................... 709/245; 709/228
(58) Field of Classification Search ............. 709/245, 709/228
See application file for complete search history.

(56) References Cited

U.S. PATENT DOCUMENTS 6,023,733 A 2/2000 Periasamy et al.
6,052,683 A 4/2000 Irwin
6,874,033 B1 3/2005 Sugai et al.

FOREIGN PATENT DOCUMENTS

WO 2004015919 A2 2/2004

OTHER PUBLICATIONS

International Search Report/Written Opinion for PCT Patent Application No. PCT/US2007/088468, mailed on Jun. 10, 2008, 8 pages.
International Preliminary Report on Patentability received for PCT Patent Application No. PCT/US2007/088468, mailed on Jul. 9, 2009, 6 Pages.
"High-Definition Multimedia Interface", *Specification Version 1.3*, (Jun. 22, 2006),123-126.

*Primary Examiner*—Paul H Kang
(74) *Attorney, Agent, or Firm*—Ryder, Lu, Mazzeo and Konieczny, LLC; Douglas J. Ryder

(57) ABSTRACT

In general, in one aspect, the disclosure describes a method to assign unique addresses to each sink device in a content network based on port numbers of a source and branch devices in the network. Sink devices connected to a port on the source or the branch devices are assigned a corresponding port number as a sink address. Branch devices connected to a port on the source or higher level branch devices have a corresponding port number prepended to the previously assigned sink addresses.

20 Claims, 7 Drawing Sheets

SINK DEVICE ADDRESSING MECHANISM

BACKGROUND

Multiple different video content sources are available in an audio-video network, including consumer electronics devices (e.g., camcorders, digital video recorders, game consoles) and computers. Computers may be capable of acting as multiple video content sources. The video content may be displayed on any of various display devices (e.g., TVs, monitors) in the same network. The video content from a source may be provided to one or more display devices and a display device may receive content from one or more sources. A network may connect the various content sources and the various display devices. The network may include one or more branch devices (e.g., repeaters, replicaters, composites, concentrators). The network may support the plug and play of content sources and/or display devices. The network may need to support content protection. As the network topology becomes larger and more complex the management of the network and the communications between devices becomes more complex.

Standards directed at the communication between video content sources and displays include, but are not limited to, the DisplayPort Standard, Version 1.0, published May 2006 by Video Electronics Standard Association (VESA) (hereinafter referred to as "DisplayPort Standard") and the High-Definition Multimedia Interface (HDMI) Standard, Version 1.3, published Jun. 22, 2006 by HDMI Licensing, LLC (hereinafter referred to as "HDMI Standard").

BRIEF DESCRIPTION OF THE DRAWINGS

The features and advantages of the various embodiments will become apparent from the following detailed description in which.

DETAILED DESCRIPTION

Figure 1:
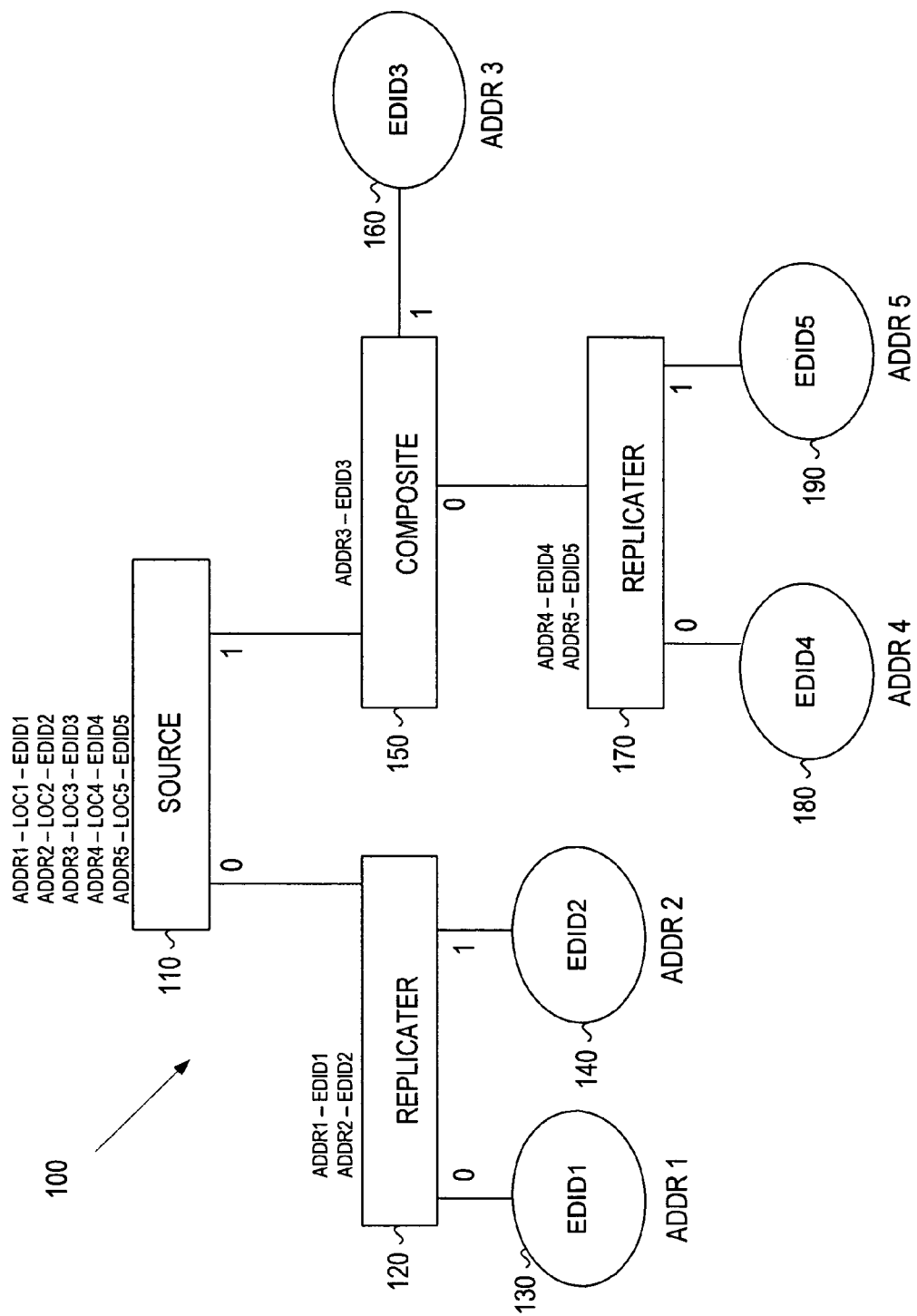
FIG. 1 illustrates an example content network, according to one embodiment.

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, techniques, etc., such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Content (e.g., video, audio/video) networks may include one or more content sources (e.g., computer, digital video recorder, game console) to provide content, one or more branch devices to route the content, and one or more sink devices (e.g., television, monitor) to present (e.g., display) the content. The branch devices may include repeaters, replicaters, composites, and concentrators.

Repeaters are used to extend the distance that content can be sent (e.g., maximum distance without repeater may be 15 feet). Repeaters have one input port and one output port. Replicaters are used to duplicate the content so that multiple copies can be transmitted downstream (e.g., can be displayed on multiple displays). Replicaters have one input port and multiple output ports (1 input to N outputs). Composites include a display but can also replicate and transmit the content downstream. A television that is capable of receiving content from a DVD player and displaying the content as well as replicating the content and transmitting the content to another display is an example of a composite. Composites include 1 input port and one or more output ports in addition to the display (1 input to display and N outputs). Single source concentrators are used to receive content from multiple sources and to select the content from one source to forward downstream. Multi-source concentrators could allow for different sources to simultaneously be active and allowing only one downward stream by mixing or compositing the separate images into one stream propagated down. Concentrators have multiple input ports and typically have one output port (M inputs to 1 output). A topology can contain a combination of these branch device types to accomplish different connections between source and sink devices.

In order for the source to communicate (e.g., provide content) with the sink device, the source needs to know parameters about the sink device (e.g., manufacturer name, product type, display type, timings supported, display size, product name, product serial number). The sink device may include a data structure (e.g., file) that identifies parameters about the display stored in memory. For example, the data structure may be an extended display identification data (EDID). The EDID identifies various parameters about the display including manufacturer name, product type, display type, timings supported by the display, display size, product name, serial number, luminance data, phosphor or filter type, and pixel mapping data (for digital displays only).

The source may assign network IDs for each of the elements (branch devices, sink devices) in the network and track routing information for each of the addresses as well as the parameters (e.g., EDID) for the sink devices.

FIG. 1 illustrates an example content (e.g., audio/video) network 100. The network 100 includes a content source device (e.g., computer, digital video recorder, game console) 110, a first replicater 120 connected to a first display 130 and a second display 140, a composite 150 connected to a third display 160 (the third display 160 may be part of the composite 150) and a second replicater 170, the second replicater 170 is connected to a fourth display 180 and a fifth display 190.

Each display may be assigned an address when it is added to the network 100. The address may be assigned by the source with which it is connected (only one source 110 illustrated). The source 110 may keep track of the address assigned to each display, the location of the display in the network topology, and the parameters associated with the displays (defined in the displays data structure). The branch devices may keep track of the addresses and parameters for each display connected thereto. The source 110 continually updates its records to add or remove display addresses when displays or branch devices are added or removed from the network topology. When updating its records for the addition or removal of devices the source 110 may have to reassign addresses. Moreover, the source 110 may need to look up addresses in order to configure or communicate with other devices in the network 100. Furthermore, if a concentrator is used in the network to select between multiple content sources for a specific display each source may assign the same display a different network address creating potential confusion.

Utilizing the port IDs for the source and branch devices as an addressing scheme, provides consistency and eliminates the need to track addresses to network locations. Each source and each branch device numbers it ports. Displays connected to those ports are assigned a device number based on the port number. Each source and each branch device having downstream branch devices connected to a port has the port ID added to the downstream address it receives. The port ID may be prepended to (added to the front of) the downstream address it receives.

Figure 2:
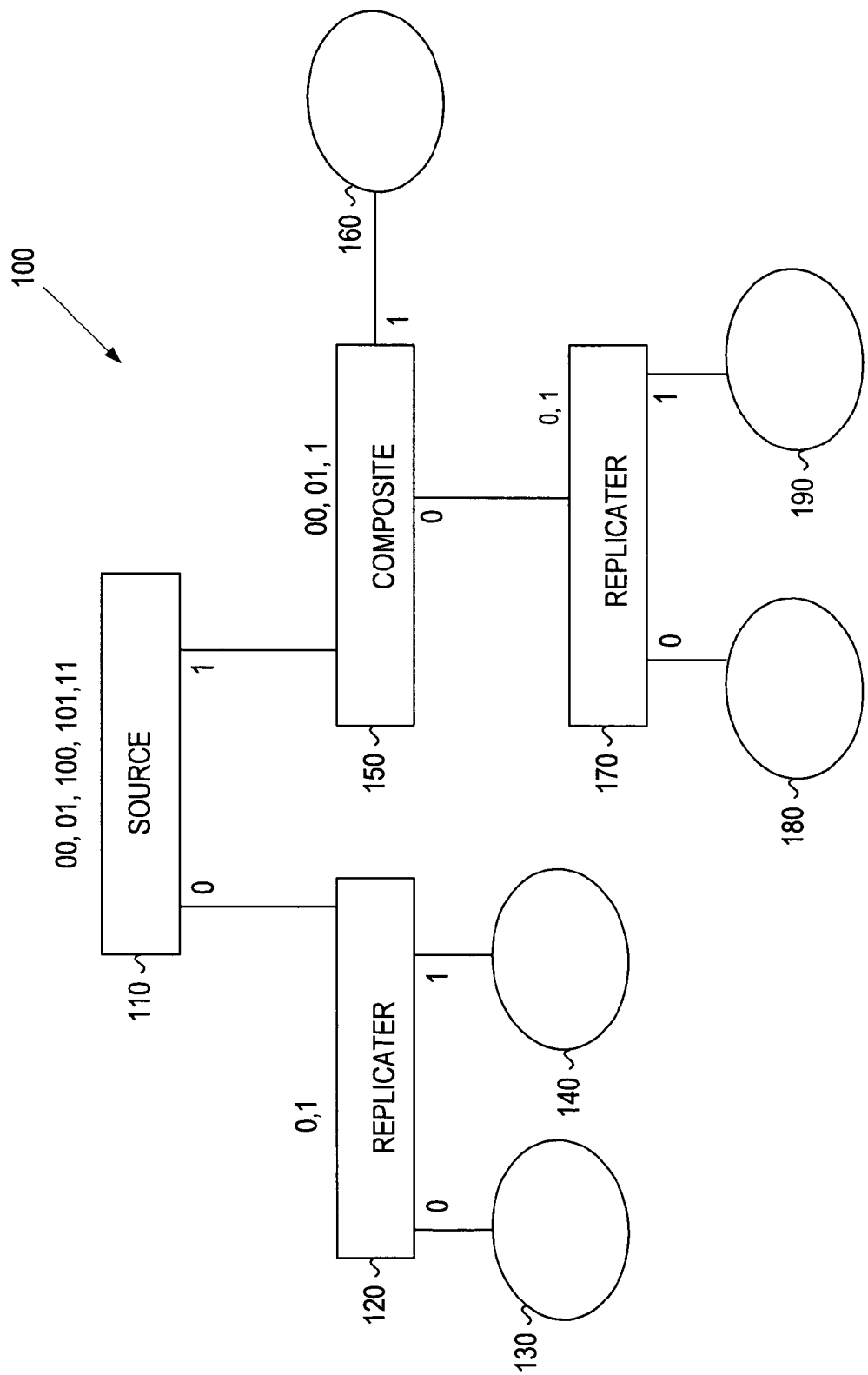
FIG. 2 illustrates the example content network of FIG. 1 using a port number addressing scheme, according to one embodiment.

FIG. 2 illustrates the example content network of FIG. 1 using the port number addressing scheme. The source 110 has port 0 and port 1. Port 0 is connected to the first replicater 120 that has port 0 and port 1. The first display 130 is connected to port 0 and the second display 140 is connected to port 1. Accordingly, the first branch device 120 assigns the first and second displays 130, 140 address 0 and address 1 respectively. The source 110 prepends 0 to the display addresses received via port 0 so that the source 110 assigns the display addresses of the first and second displays 130, 140 as 00 and 01 respectively.

Port 1 of the source 110 is connected to the composite 150. The composite 150 has port 0 and port 1. The second replicater 170 is connected to port 0 and the third display 160 is connected to port 1. The third display 160 is accordingly assigned address 1 by the composite 150. The second replicater 170 has port 0 and port 1. The fourth display 180 is connected to port 0 and the fifth display 190 is connected to port 1. Accordingly, the second replicater 170 assigns the fourth and fifth displays 180, 190 addresses 0 and address 1 respectively. The composite 150 prepends port 0 to the display addresses received via port 0 so that the composite 150 assigns the display addresses of the fourth and fifth displays 180, 190 as 00 and 01 respectively. The source 110 prepends 1 to the display addresses received via port 1 so that the source 110 assigns the display addresses of the third, fourth and fifth displays 160, 180, 190 as 11, 100, 101 respectively.

This addressing scheme has the network topology built into the unique address that the source 110 has for each display. The address provides the route to the display. For example, address 100 means that the route is from port 1 of the source 100 to port 0 of the composite 150 connected to port 1 of the source 110, to port 0 of the second replicater 170 connected to port 0 of the composite 150 (or the fourth display 180). The amount of digits (port numbers) in the address defines the number of levels in the topology for the particular display. For example, the first display 130 is identified by the source 110 as address 00 indicating it is two layers into the topology. The fourth display 180 has an address of 100 indicating that it is the third layer of the topology.

As illustrated, each device only has two ports (ports 0 and 1) so that a single bit can define the appropriate port at each level of the topology. If more ports were available for an element (source or branch device) in the network then additional bits would be required to identify the appropriate port at each level. For example, if a branch device had 8 output ports, 3 bits would be required to identify which port. The addressing scheme may use 3 bits to identify the port for each source or branch device even if they all did not include that many ports.

The port number addressing scheme allows the source to be easily updated when receiving elements (e.g., branch device, display) are added or removed from the network topology. When a receiving element is removed from a port of a transmitting element (e.g., source, branch device) the transmitting element eliminates all of the addresses associated with that port. When a receiving element is added to a port of a transmitting element it is assigned the port number as an address and the port numbers of upstream transmitting elements is prepended to the address.

Figure 3:
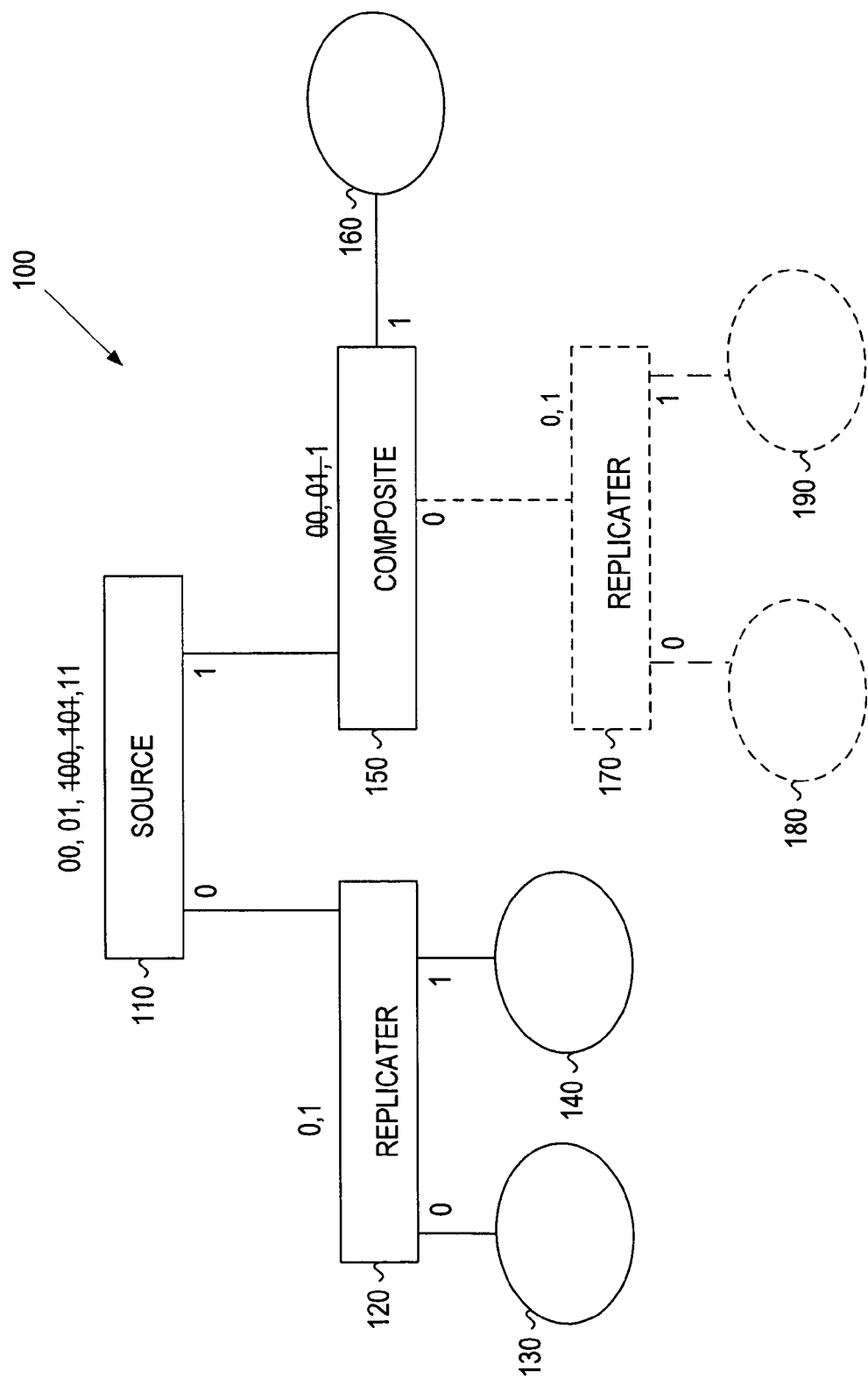
FIG. 3 illustrates removal (unplug) of elements in the example network of FIG. 2, according to one embodiment.

FIG. 3 illustrates removal (hot unplug) of some of the elements from the example network of FIG. 2. The second replicater 170 is removed from port 0 of the composite 150 so that the addresses associated with port 0 (00 and 01) are removed from the composite 150, and those addresses prepended with port 1 (100, 101) from the source 110 are removed from the source 110. All of the other addresses remain the same. If only the fourth display 180 was removed only the address associated with that display would be removed from the upstream elements. If both the fourth and fifth displays 180, 190 were removed it would have the same effect as removing the second replicater 170 since the second replicater 170 would not forward any display addresses upstream.

Figure 4:
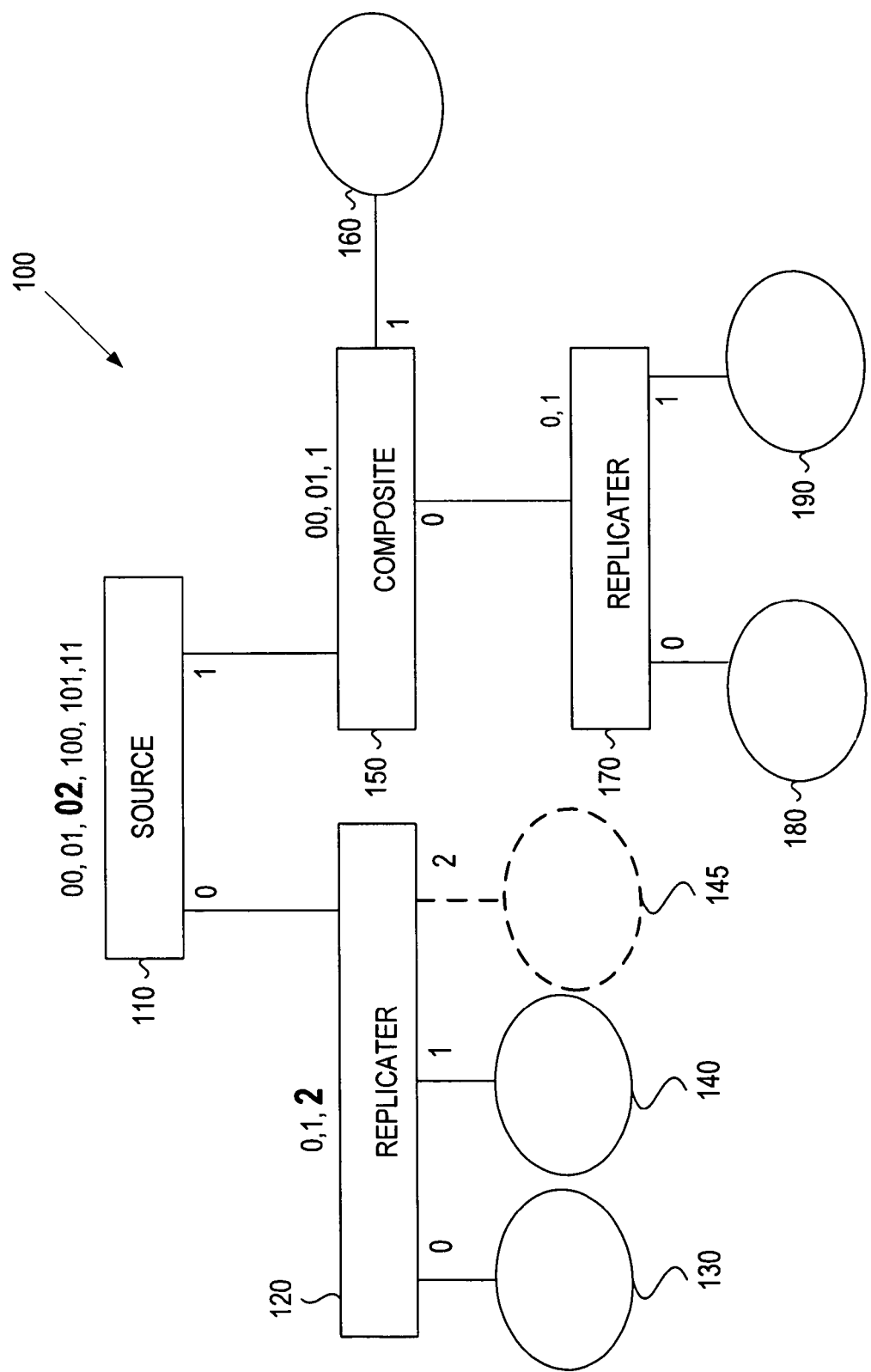
FIG. 4 illustrates adding (plug) elements to the example network of FIG. 2, according to one embodiment.

FIG. 4 illustrates adding (hot plug) of an additional display to the example network of FIG. 2. The first replicater 120 had a third port (port 2) and a sixth display 145 was connected to the third port. Accordingly, the first replicater 120 assigns the sixth display 145 address 2. The source 110 prepends port 0 to display address 2 so the source 110 now identifies the sixth display 145 with address 02. It should be noted we used 2 in the address for simplicity. Since the first replicater 120 has three ports, each transmitting device may use two bits to identify its ports. Accordingly, the address for the sixth display 145 at the source 110 may be 0010 to identify port 0 of the source 110 and port 2 of the first replicater 120.

Figure 5:
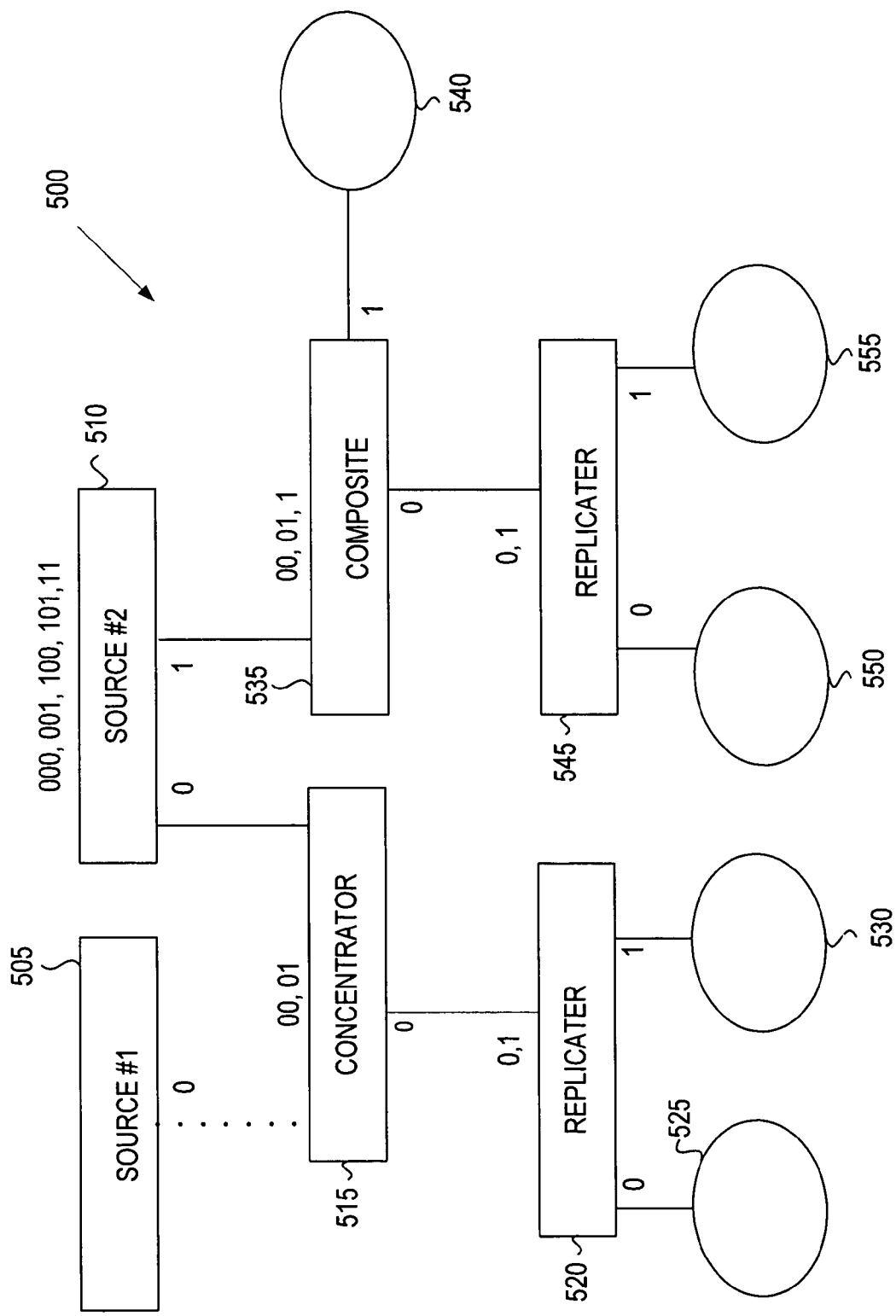
FIG. 5 illustrates an example content network that includes multiple content sources, according to one embodiment.

FIG. 5 illustrates an example content network 500 that includes multiple sources. The network 500 includes a first source 505 and a second source 510. Port 0 of each source 505, 510 is provided to a concentrator 515. The concentrator 515 selects which source 505, 510 to forward content from. The concentrator 515 has a first replicater 520 connected to port 0. The first replicater 520 has a first display 525 connected to port 0 and a second display 530 connected to port 1. Accordingly, the first replicater 520 assigns the first display 525 address 0 and the second display 530 address 1. The concentrator 515 prepends port 0 to each display address so that it identifies the first display 525 as address 00 and the second display 530 as address 01.

The second source 510 has a composite 535 connected to port 1. The composite 535 has port 0 and port 1. A second replicater 545 is connected to port 0 and a third display 540 is connected to port 1. The third display 540 is accordingly assigned address 1 by the composite 535. The second replicater 545 has port 0 and port 1. A fourth display 550 is connected to port 0 and a fifth display 555 is connected to port 1. The second replicater 545 assigns the displays 550, 555 addresses 0 and 1 respectively. The composite 535 prepends 0 (for port 0) to the display addresses so that the composite assigns addresses the fourth and fifth displays 550, 555 as 00 and 01 respectively. The second source 510 prepends 1 to the display addresses received via port 1 so that the source 510 assigns the display addresses of the third, fourth and fifth displays 540, 550, 555 as 11, 100, 101 respectively.

If the concentrator 515 selects content from the second source 510, the second source 510 prepends 0 (for port 0) to the addresses for the first and second displays 525, 530 received from the concentrator 515. Accordingly, the second source 510 assigns the addresses of the first and second displays 525, 530 as 000 and 001 respectively.

Figure 6:
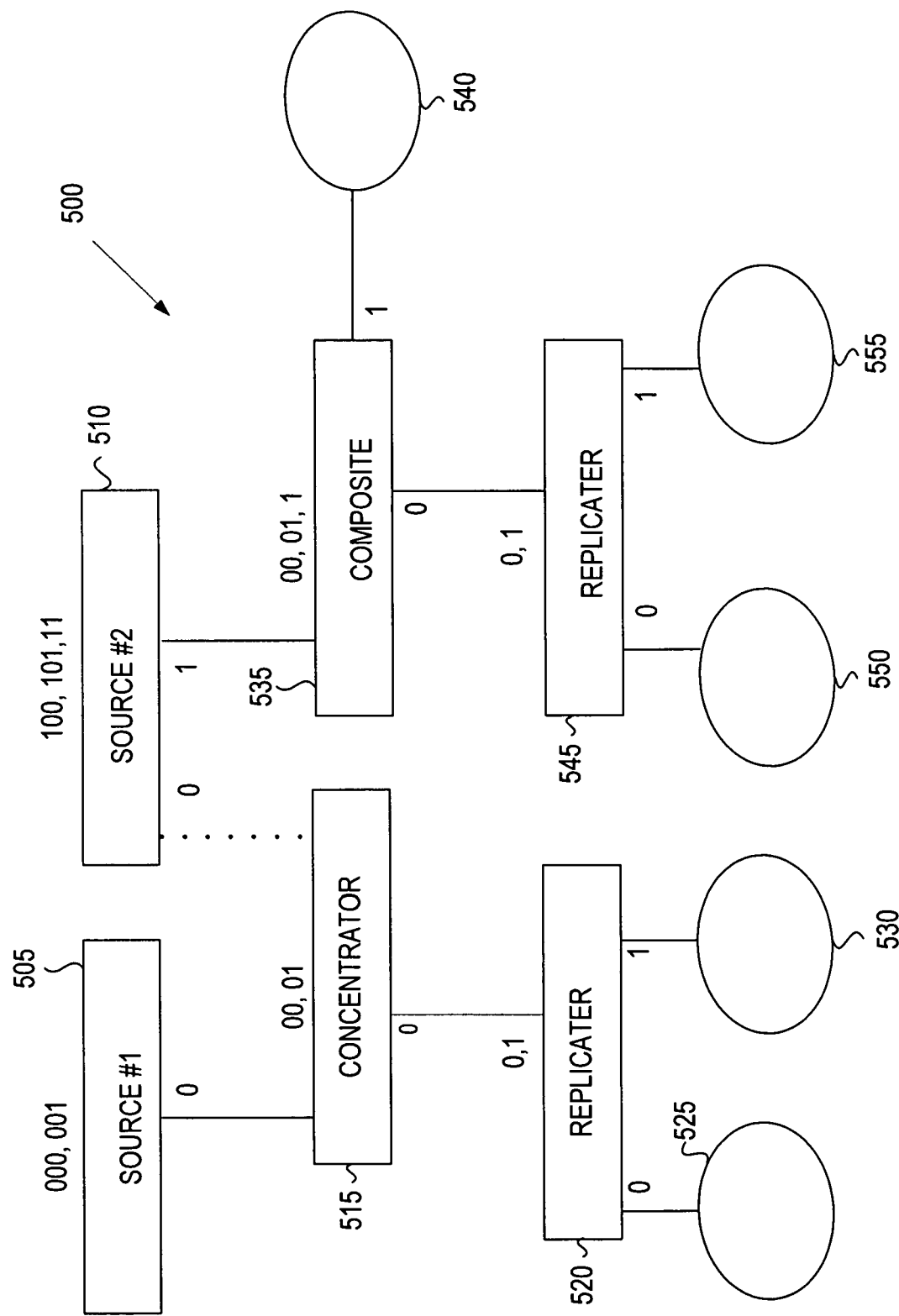
FIG. 6 illustrates the example network of FIG. 5 having a concentrator switch what source provides content, according to one embodiment.

FIG. 6 illustrates the example content network of FIG. 5 if the concentrator 515 selects the first source 505. The first source 505 now receives the addresses for the first and second displays 525, 530 from the concentrator 515 and prepends 0 for port 0 thereto. Accordingly, the first source 505 assigns the addresses of the first and second displays 525, 530 as 000 and 001 respectively. The addresses associated with port 0 of the second source 510 (000, 001) are removed therefrom. All of the other display addresses in the sources and branch devices remain the same.

It should be noted that some of the addresses are the same. For example, the addresses associated with the first and second displays 525, 530 are 000 and 001 for both the first and second sources 505, 510. The addresses are unique in the name space of the source they are associated with.

In order to establish the network topology and addresses, the source and the branch devices need to assign sink addresses based on the port number for sinks connected thereto and prepend port numbers to existing sink addresses.

Once the network is established, for each port of the source a determination is made as to whether a plug event has happened. For each port that had a plug event, a determination is made as to whether a branch device is connected to the port. If a branch device is connected to the port, the source issues a command to the branch device to get the topology data therefrom (a get topology command). Once the source receives the topology data (sink addresses) from the branch device the source will prepend the port number to the sink addresses. If a branch device is not connected to the port, a sink must be connected to the port so the source assigns the port number to the sink device.

When a branch device receives a get topology command from the source, it will for each port make a determination as to whether a plug event has happened. For each port that had a plug event, a determination is made as to whether a branch device (downstream branch device) is connected to the port. If a downstream branch device is connected to the port, a get topology command is sent to the downstream branch device. Once the sink addresses are received from the downstream branch device the branch device prepends the port number to the sink addresses. If a sink is connected to the port, the branch device assigns the port number to the sink device. Once the branch device gathers and/or assigns all the addresses it forwards the list of sink addresses upstream to the source or branch device that issued the get topology command.

The get topology commands are initiated by the source devices top down and the sink addresses are built from bottom up.

When a hot plug event is detected the event is propagated up to the source. If the hot plug event is due to the addition of a sink (the hot plugged device is a sink), the port number for the port to which it is plugged is used as an address for the sink. If the sink was not added to the source, the address is sent up the topology with each higher level prepending an associated port number to the address. If the hot plug event is due to the addition of a branch device, a get topology command is issued as multiple sink devices may be connected thereto. The sink addresses are provided to the issuer of the get topology command. If required, the addresses are sent up the topology with each higher level prepending an associated port number to the addresses.

When a hot unplug event is detected the event is propagated up to the source. If the hot unplug event is due to removal of a sink (the hot unplugged device is a sink), the sink address (port number) in the address space of the source device is no longer used (is removed). If the sink was not removed from the source, the appropriate sink address is also removed from each higher level of the topology (the appropriate sink address at each higher level includes additional prepended port numbers). If the hot unplug event is due to removal of a branch device, the sink addresses for all the sinks in the sub-tree are no longer used in the address space of all impacted source devices. If the branch device was not unplugged from the source, the appropriate sink addresses are also no longer used from each higher level of the topology.

Multiple simultaneously active sources would have independent address spaces for the sink devices they can communicate with. When multi-source concentrators are used, each source would use its unique address to send content to such a concentrator, with that concentrator sending a single data stream data downstream to sink devices downstream.

The source obtaining parameters for the sink devices (e.g., EDID) is decoupled from the addressing scheme. The EDIDs may be provided while the sink devices are being assigned addresses based on the network topology. For example, as the addresses are being propagated upstream the EDID data may be sent upstream as well. Alternatively, the EDID data may be obtained after the sink addresses have been assigned. Likewise, the EDID data may be removed from the source when a sink device is removed (e.g. hot unplug) or the EDID data may be maintained until a later time.

Using this addressing scheme allows the network to be managed without the need for coordinating addresses and routing information. A source may now be able determine or set various parameters (e.g., configuration data, sync capabilities, content protection, power) based on the addresses of the sink devices. The source may determine status (e.g., issue link integrity checks) or perform maintenance (e.g., disable port) by using the addresses. The sources may also be able to determine or set parameters for branch devices based on the address of the branch device. For example, if the first and second displays 130, 140 of FIGS. 2-3 were not allowed to display certain content the source 110 could program the first replicater 120 to not allow that content. The branch devices may be able to determine or set parameters for displays connected thereto or downstream. The addressing scheme may enable downstream devices to initiate communication with upstream devices or devices on other legs of the topology.

The sources and the branch devices may need to be modified to utilize the port addressing scheme to assign port numbers as sink addresses, to prepend port numbers to downstream addresses, to issue and process get topology commands, and to support hot plug and unplug. In addition the source may be modified to include new auxiliary commands (e.g., configure) and the branch devices may be modified to support these new commands and translate to the sinks as needed. No changes are needed to the sink devices (displays). The changes to the source and branch devices may be changes to software running thereon. The source and branch devices may include memory for storing a program thereon and a processor for executing the program. The program may execute the port number addressing scheme described above.

The port number addressing scheme may be incorporated into devices supporting any number of standards including, but not limited to, the DisplayPort Standard and the HDMI Standard.

Figure 7:
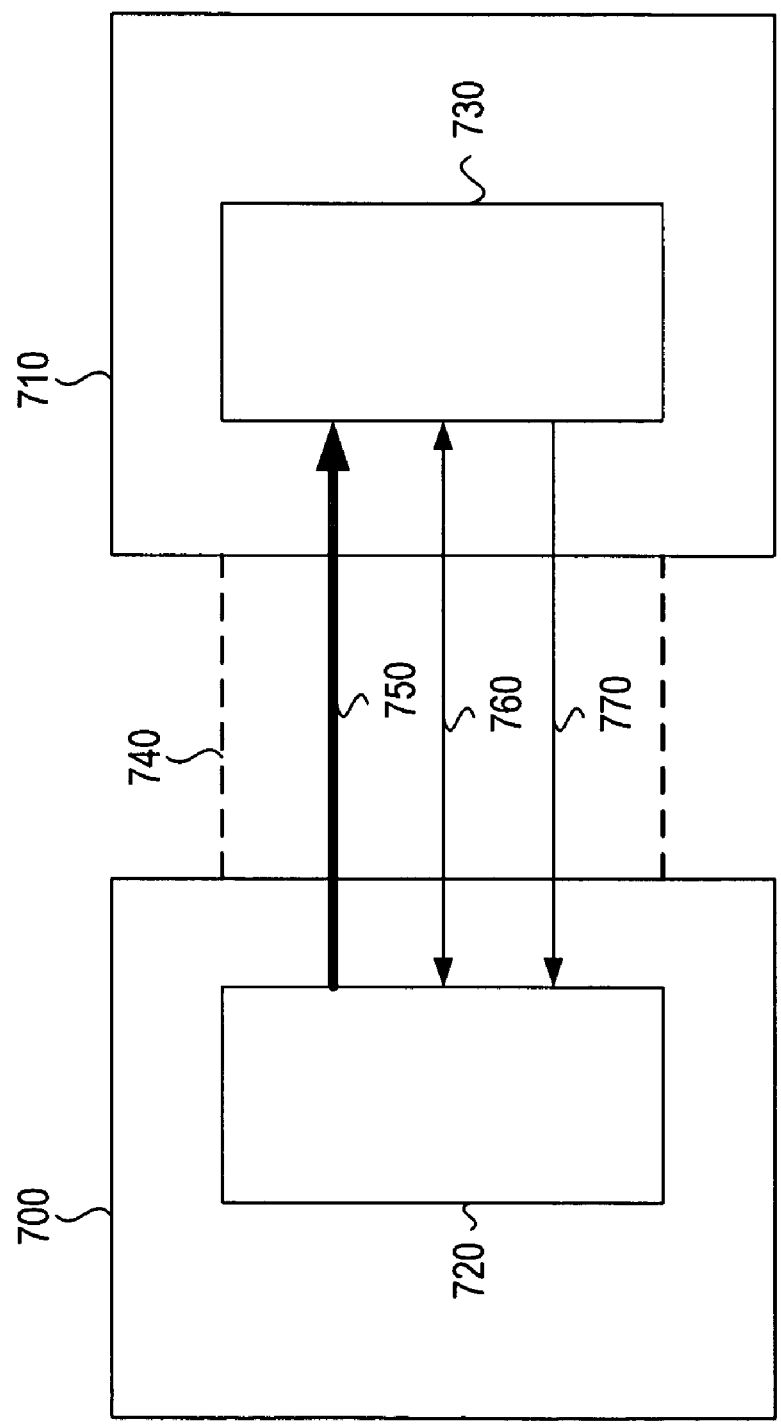
FIG. 7 illustrates an example communication link between a source device and a sink device, according to one embodiment.

FIG. 7 illustrates an example DisplayPort communication link between a source device 700 and a sink device 710. The source device 700 includes a DisplayPort transmitter 720 and the sink device 710 includes a display port receiver 730. The source device 700 and the sink device 710 are connected via a DisplayPort cable 740. The cable 740 includes a main link 750, an auxiliary channel 760 and a hot plug content channel 770. The main link 750 is used to transmit the content from the source 700 to the sink 710. The auxiliary channel 760 may be used to transmit display data (e.g., EDID) from the sink device 710 to the source device 700 and auxiliary commands (e.g., configure, status checks) from the source device 700 to the sink device 710. The port number addressing scheme (the transmission of get topology commands and the return of the topology data) can be communicated over the auxiliary channel 760. The hot plug content channel 770 is used to signal a hot plug/unplug event or other sink events.

The source 700 and the sink 710 may include memory (not illustrated) containing programs for controlling the operation of the devices. Programs to implement the port number addressing scheme may be included in memory of the source device 700. No programming changes are required for the sink devices. The transmitter 710 and the receiver 720 may execute the programs or the source 700 and the sink 710 may include processors (not illustrated) that execute the programs and control the transmitter 720 and the receiver 730.

FIG. 7 was discussed with specific reference to DisplayPort but is not limited thereto. Rather any communication link including a main link and an auxiliary channel to communicate is within the scope.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

An embodiment may be implemented by hardware, software, firmware, microcode, or any combination thereof. When implemented in software, firmware, or microcode, the elements of an embodiment are the program code or code segments to perform the necessary tasks. The code may be the actual code that carries out the operations, or code that emulates or simulates the operations. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor/machine readable/accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The term "data" here refers to any type of information that is encoded for machine-readable purposes. Therefore, it may include program, code, data, file, etc.

All or part of an embodiment may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

An embodiment may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various embodiments are intended to be protected broadly within the spirit and scope of the appended claims.

What is claimed:

1. A machine-readable storage medium storing computer executable instructions, which, when executed by a machine causes the machine to:

determine which ports on a source device indicate a plug event has occurred;

determine which of the ports on the source device that indicated a plug event has occurred are connected to a branch device;

for each port that is connected to a branch device request topology data from the branch device connected to the port, receive the topology data from the branch device, wherein the topology data includes partial sink addresses for sink devices associated with the branch device, and wherein the partial sink addresses for the sink devices are based on port numbers of the branch devices that the sink devices are connected to, and prepend port number of the port of the source device associated therewith to the topology data received from the branch device to create source sink addresses for the associated sink devices;

for each port that indicated a plug event occurred that is not connected to a branch device, assign port number of the port of the source device associated therewith as source sink address for a sink device connected thereto; and store the source sink addresses for the sink devices associated with the source device.

2. The machine-readable storage medium storing computer executable instructions of claim 1, which when executed by the machine further causes the machine to detect a hot plug event on an available port;
   determine if a branch device is connected to the available port;
   if a branch device is connected to the available port
      request topology data from the branch device connected to the available port,
      receive the topology data from the branch device, and
      prepend port number of the available port to the topology data received from the branch device to create source sink addresses for the associated sink devices;
   if a branch device is not connected to the available port, assign port number of the available port as source sink address for a sink device connected thereto; and
   store the source sink addresses for the sink devices connected to the source device during the hot plug event.

3. The machine-readable storage medium storing computer executable instructions of claim 1, which when executed by the machine further causes the machine to detect a hot unplug event on an active port; and
   remove source sink addresses associated with port number of the hot unplug port.

4. The machine-readable storage medium storing computer executable instructions of claim 1, wherein the machine-readable storage medium is located in a DisplayPort compliant device.

5. The machine-readable storage medium storing computer executable instructions of claim 1, wherein the source sink addresses identify network topology details at the source device.

6. An audio/video dissemination network, comprising
   a content source to provide content;
   one or more branch devices to route the content;
   one or more sink devices to present the content; and
   a plurality of cables to connect the content source, the branch devices and the sink devices,
   wherein the content source includes a processor and a processor-readable storage medium storing computer executable instructions, which, when executed by the processor causes the processor to:
   determine which ports on the content source indicate a plug event has occurred;
   determine which of the ports on the content source that indicated a plug event has occurred are connected to a branch device;
   for each port that is connected to a branch device
      request topology data from the branch device connected to the port,
      receive the topology data from the branch device, wherein the topology data includes partial sink addresses for sink devices associated therewith that is based on port numbers of the branch devices that the sink devices are connected to, and
      prepend port number of the port of the content source to the topology data received from the branch device to create source sink addresses for the associated sink devices;
   for each port that indicated a plug event occurred that is not connected to a branch device, assign port number of the port of the content source as sink address for the sink device connected thereto; and
   store the source sink addresses for the sink devices associated with the source device.

7. The network of claim 6, wherein the cables include a main link to transmit the content and an auxiliary channel to provide communications between devices.

8. The network of claim 6, wherein when the computer executable instructions stored in the content source processor-readable storage medium are executed by the content source processor they further cause the content source processor to
   detect a hot plug event on an available port;
   determine if a branch device is connected to the available port;
   if a branch device is connected to the available port
      request topology data from the branch device connected to the available port,
      receive the topology data from the branch device, and
      prepend port number of the available port to the topology data received from the branch device to create source sink addresses for the associated sink devices;
   if a branch device was not connected to the available port, assign port number of the available port as source sink address for a sink device connected thereto; and
   store the source sink addresses for the sink devices connected to the source device during the hot plug event.

9. The network of claim 6, wherein when the computer executable instructions stored in the content source processor-readable storage medium are executed by the content source processor they further cause the content source processor to
   detect a hot unplug event on an active port; and
   remove source sink addresses associated with port number of the hot unplug port.

10. The network of claim 6, wherein each of the one or more branch devices includes a processor and a processor-readable storage medium storing computer executable instructions, which, when executed by the processor causes the processor to:
   determine which ports on the branch device indicate a plug event has occurred;
   determine which of the ports on the branch device that indicated a plug event has occurred are connected to a lower level branch device;
   for each port that is connected to a lower level branch device
      request topology data from the lower level branch device connected to the port,
      receive the topology data from the lower level branch device, and
      prepend port number of the port of the branch device to the topology data received from the lower level branch device; and
   for each port that indicated a plug event occurred that is not connected to a lower level branch device, assign port number of the port of the branch device as sink address for the sink device connected thereto; and
   upon request for topology data from the source device or an upper level branch device, forward the topology data, wherein the topology data includes the sink addresses for the sink devices associated with therewith.

11. The network of claim 10, wherein when the computer executable instructions stored in the branch device processor-readable storage medium are executed by the branch device processor they further cause the branch device processor to
   detect a hot plug event on an available port;
   determine if a lower level branch device is connected to the available port;
   if a lower level branch device is connected to the available port request topology data from the lower level branch device connected to the available port, receive the topology data from the lower level branch device, and prepend port number of the available port to the topology data received from the lower level branch device;

if a lower level branch device is not connected to the available port, assign port number of the available port as sink address for a sink device connected thereto; and upon request for topology data from the source device or an upper level branch device, forward the topology data.

12. The network of claim 10, wherein when the computer executable instructions stored in the branch device processor-readable storage medium are executed by the branch device processor they further cause the branch device processor to detect a hot unplug event on an active port;

update topology data to remove source sink addresses associated with port number of the hot unplug port; and upon request for topology data from the source device or an upper level branch device, forward the updated topology data.

13. An audio/video dissemination network, comprising a content source to provide content;

one or more branch devices to route the content;

one or more sink devices to present the content; and a plurality of cables to connect the content source, the branch devices and the sink devices, wherein the content source is configured to assign a source sink address to a sink device connected to a first port of the content source, wherein the source sink address assigned is port number of the first port;

request topology data from a branch device connected to a second port of the content source;

receive the topology data from the branch device, wherein the topology data includes partial sink addresses for sink devices associated therewith that is based on port numbers of the branch devices that the sink devices are connected to, and add port number of the second port to the topology data received from the branch device to create source sink addresses for the associated sink devices.

14. The network of claim 13, wherein the content source is further configured to detect a hot plug event on a third port;

if hot plug event is connection of a sink device, assign port number of the third port as a source sink address for the sink device connected thereto;

if hot plug event is connection of a branch device, request topology data from the branch device;

receive the topology data from the branch device;

add port number of the third port to the topology data received from the branch device to create source sink addresses for the associated sink devices.

15. The network of claim 13, wherein the content source is further configured to detect a hot unplug event on a fourth port; and update topology data to remove source sink addresses associated with port number of the fourth port.

16. The network of claim 13, wherein each of the one or more branch devices is configured to assign a branch level sink address to a sink device connected to a first port of the branch device, wherein the branch level sink address assigned is port number of the first port;

request topology data from a lower level branch device connected to a second port of the branch device;

receive the topology data from the lower level branch device, wherein the topology data includes partial sink addresses for sink devices associated therewith that is based on port numbers of the lower level branch devices that the sink devices are connected to;

add port number of the second port to the topology data received from the lower level branch device to create branch level addresses for the associated sink devices; and upon request for topology data from the source device or an upper level branch device, forward the branch level sink addresses.

17. The network of claim 16, wherein each of the one or more branch devices is further configured to detect a hot plug event on a third port;

if hot plug event is connection of a sink device, assign port number of the third port as a branch level sink address for the sink device connected thereto;

if hot plug event is connection of a lower level branch device, request topology data from the lower level branch device;

receive the topology data from the lower level branch device;

add port number of the third port to the topology data received from the lower level branch device to create branch level sink addresses for the associated sink devices.

18. The network of claim 16, wherein the content source is further configured detect a hot unplug event on a fourth port; and update topology data to remove branch level sink addresses associated with port number of the fourth port; and upon request for topology data from the source device or an upper level branch device, forward the updated topology data.

19. The network of claim 13, wherein the content source, the one or more branch devices and the one or more sink devices are DisplayPort compliant devices.

20. The network of claim 13, wherein the source device is further configured to identify network topology details based on the source sink addresses.

* * * * *

UNITED STATES PATENT AND TRADEMARK OFFICE
CERTIFICATE OF CORRECTION

| | | |
|---|---|---|
| PATENT NO. | : 7,765,323 B2 | Page 1 of 1 |
| APPLICATION NO. | : 11/648367 | |
| DATED | : July 27, 2010 | |
| INVENTOR(S) | : Srikanth Kambhatla | |

It is certified that error appears in the above-identified patent and that said Letters Patent is hereby corrected as shown below:

In column 12, line 41, in claim 18, after "configured" insert -- to --.

Signed and Sealed this

Twenty-sixth Day of October, 2010

David J. Kappos
*Director of the United States Patent and Trademark Office*